(12) United States Patent
Mathew et al.

(10) Patent No.: US 8,954,488 B2
(45) Date of Patent: Feb. 10, 2015

(54) EXTENSIBILITY FOR WEB BASED DIAGRAM VISUALIZATION

(75) Inventors: Abraham Mathew, Redmond, WA (US); Philippe-Joseph Arida, Edmonds, WA (US); Emil Cicos, Kirkland, WA (US); Raveendrnathan Loganathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 12/357,243

(22) Filed: Jan. 21, 2009

(65) Prior Publication Data

US 2010/0185928 A1    Jul. 22, 2010

(51) Int. Cl.
G06F 15/16 (2006.01)
G06F 17/30 (2006.01)

(52) U.S. Cl.
CPC .................. *G06F 17/30905* (2013.01)
USPC ........................................................ 709/203

(58) Field of Classification Search
CPC .............................................. G06F 17/30905
USPC ........................................................ 709/203
See application file for complete search history.

(56) References Cited

U.S. PATENT DOCUMENTS

| 7,127,452 B1 | 10/2006 | Yashiro |
| 7,127,453 B1 * | 10/2006 | Frazier et al. ......................... 1/1 |
| 2004/0215740 A1 | 10/2004 | Frank et al. |
| 2004/0221002 A1 | 11/2004 | Karim |
| 2006/0112123 A1 | 5/2006 | Clark et al. |
| 2006/0125827 A1 | 6/2006 | Adereth et al. |
| 2006/0136894 A1 | 6/2006 | Stallo et al. |
| 2008/0082569 A1 * | 4/2008 | Mansour et al. ............... 707/102 |
| 2008/0147824 A1 | 6/2008 | Hendrey |
| 2009/0031401 A1 * | 1/2009 | Cudich et al. ..................... 726/4 |
| 2009/0113377 A1 * | 4/2009 | Cacenco et al. ............... 717/100 |
| 2009/0177685 A1 * | 7/2009 | Ellis et al. .................. 707/10 R |

FOREIGN PATENT DOCUMENTS

| CN | 1555533 A | 12/2004 |
| CN | 1669020 A | 9/2005 |
| JP | 2007094780 A | 4/2007 |
| JP | 2007233973 A | 9/2007 |
| RU | 2302089 C2 | 6/2007 |
| RU | 2357279 C2 | 5/2009 |

(Continued)

OTHER PUBLICATIONS

Work with Sample Diagrams and Data http://office.microsoft.com/en-us/visio/HA101175931033.aspx.

(Continued)

*Primary Examiner* — Bryan Lee
(74) *Attorney, Agent, or Firm* — Steve Crocker; Jim Ross; Micky Minhas

(57) ABSTRACT

Extensible architecture and data flow in a web based diagram visualization service is accomplished by enabling a diagram update engine to launch custom data modules. Data modules for data sources that are not inherently supported are created by third parties through a specially defined interface (e.g. .NET® assemblies) and made visible for the web based diagram services and callable from a diagram update engine. Thus, a number of data sources from which diagram data can be retrieved and the way incoming data is manipulated and aggregated is extensible through code.

19 Claims, 7 Drawing Sheets

(56) References Cited

FOREIGN PATENT DOCUMENTS

| WO | 2007067797 A2 | 6/2007 |
| WO | 2008121540 A1 | 10/2008 |
| WO | 2010/090675 A2 | 8/2010 |

OTHER PUBLICATIONS

Most Attractive Diagram, Chart and Graphs Online Creator http://www.narga.net/43/most-attractive-diagram-chart-and-graphs-online-creator/.

Java-based Application Framework for Visualization of Gene Regulatory Region Annotations http://bioinformatics.oxfordjournals.org/cgi/reprint/btg476v1.pdf.

Contextual Data Visualization with Microsoft Office Visio Professional 2007 http://www.virtualtechdays.com/partnervirtual-academy/PPT/Visio.pdf.

Microsoft Office Visio Standard 2007—Complete Package—1 PC—CD—Win—French http://accessories.dell.com/sna/products/Business_Office/productdetail.aspx?c=ca&l=en&s=dhs&cs=cadhs1&sku=A0951086.

Dynamic Linked Data Constellation http://www.openlinksw.com/dataspace/kidehen©openlinksw.com/weblog/kidehen©openlinksw.com's%20BLOG%20%5B127%5D/1454.

"International Search Report", Mailed Date: Jul. 26, 2010, Application No. PCT/US2009/066893, Filed Date: Dec. 4, 2009, pp. 9.

"First Office Action of Chile", Mailed Date: Apr. 22, 2013, Application No. PCT/1765-2011, Filed Date: Jul. 21, 2011, pp. 6.

"European Search Report", Mailed Date: May 2, 2012, Application No. EP 09 83 9825, Filed Date: Dec. 4, 2009, pp. 4.

"Second Office Action of Chile", Mailed Date: Oct. 4, 2013, Application No. PCT/1765-2011, Filed Date: Jul. 21, 2011, pp. 6.

"Office Action Received in Russian Federation Patent Application No. 2011130281", Mailed Date: Dec. 27, 2013, Filed Date: Dec. 4, 2009, 9 Pages.

"Notice of Rejection Received in Japanese Patent Application No. 2011-547929", Mailed Date: Dec. 19, 2013, Filed Date: Dec. 4, 2009, 6 Pages.

"First Office Action Received in Chinese Patent Application No. 200980155363.X", Mailed Date: Mar. 5, 2013, Filed Date: Dec. 4, 2009, 11 Pages.

"Second Office Action Received in Chinese Patent Application No. 200980155363.X", Mailed Date: Oct. 21, 2013, Filed Date: Dec. 4, 2009, 12 Pages.

Feng, et al., "A Study on Remote Visualization of "Ocean Vector Field Data" Based on Web Service", In Geo-Information Science, vol. 10, Issue 6, Dec. 2008, 8 Pages.

* cited by examiner

EXTENSIBILITY FOR WEB BASED DIAGRAM VISUALIZATION

BACKGROUND

One of the major contributions of computers and software to people's daily lives was the automation of widely used tasks such as word processing, spreadsheet calculations, and diagramming. Not only did these applications automate and make various tasks usable by anyone, but they also added many new capabilities in manipulating a wide range of documents and data. Until recently, a typical environment included a standalone or networked computer with a particular application installed on it. Thus, the user was working with an application installed and executed on their local computer using data also stored locally. One disadvantage of this approach is that applications may have to be reinstalled every time an updated version is available, the computing device is replaced, etc., and the user needs to be working on the machine that has the software installed on it.

A recent trend in providing the same document creation and manipulation capabilities without the burden of having a full scale application installed on the user's computer is enabling users to perform the same tasks through web access. In a typical web access service, the user may utilize a hosted service to create new documents, manipulate existing ones through a networked medium such as the Internet. The documents may be stored by the hosted service or at the user's local computer. A typical web access service is for data visualization (e.g. diagramming). Some data visualization pipelines are restricted to refresh data from a limited set of known data sources. Without a provision to enable plugging in data from custom data sources, data from non-native sources may have to be fit into a supported data source when a browser request to render data is being processed by the web server.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an extensible architecture and data flow which allows the diagram update engine to launch custom code modules. An interface according to some embodiments enables third party creation of data sources and makes them visible for the web based diagram services and callable from a diagram update engine. Thus, a number of data sources from which diagram data may be retrieved and the way incoming data is manipulated and aggregated is extensible through code using a data model according to embodiments.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
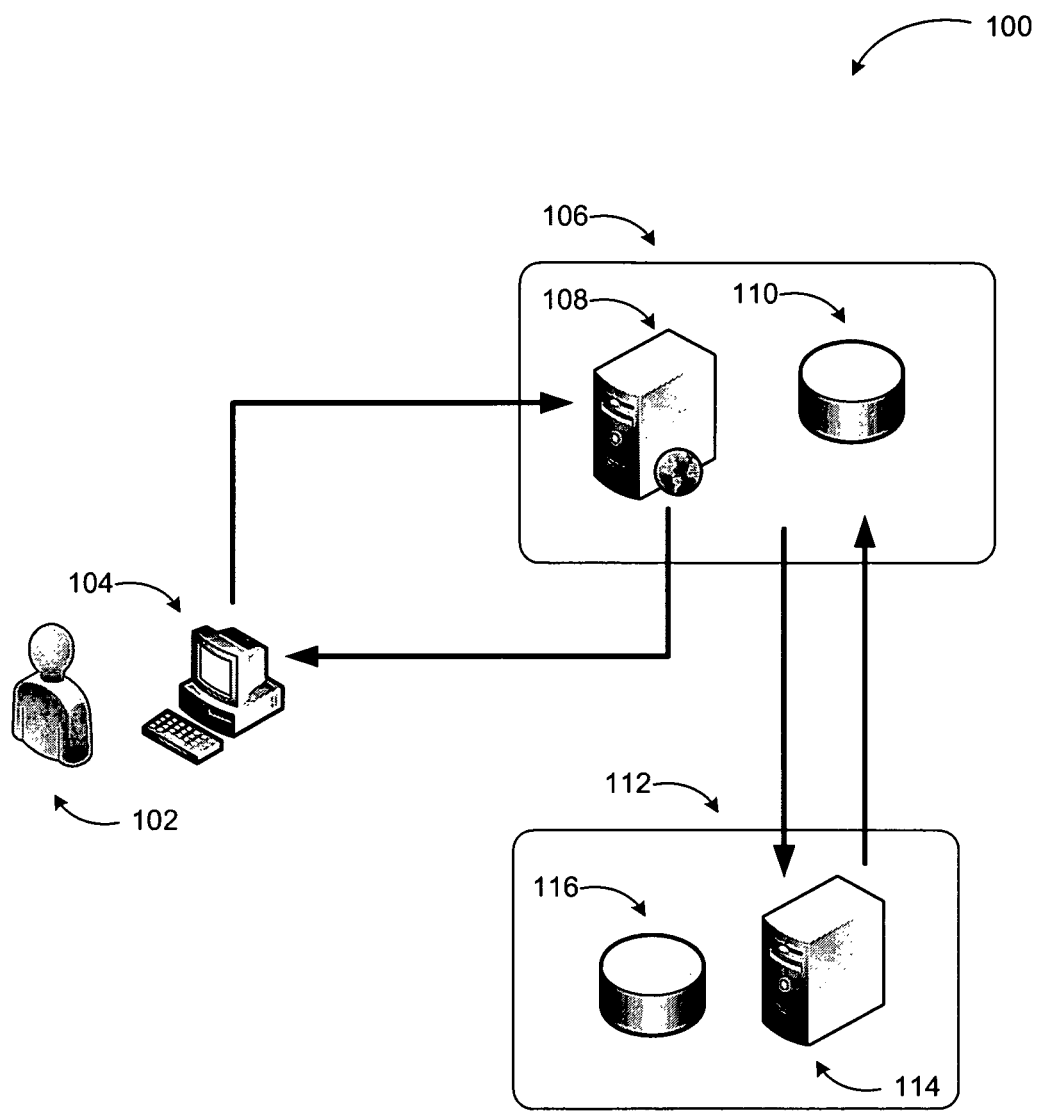
FIG. 1 is a conceptual diagram illustrating an example web accessible diagramming service, where embodiments may be implemented.

As briefly described above, an extensible architecture and data flow may be used to enable a diagram update engine to launch custom code modules for retrieving, manipulating, and aggregating data from a variety of sources, and an interface to enable communication with non-native data sources through the custom data modules. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing web based diagramming service data. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Referring to FIG. 1, conceptual diagram 100 of an example web accessible diagramming service, where embodiments may be implemented, is illustrated. In the example system 100 of FIG. 1, web service 106 for the user provides diagram visualization functionality through one or more web applications executed on server 108 for user 102 accessing the system through a generic application such as a browser executed on computing device 104. To initiate the service, user 102 requests from server 108 of the host service 106 a diagram. Server 108, in response, communicates with server 114 of diagram service backend 112 retrieving data, computing formulas, relationships, etc.

Diagrams may include static or dynamic elements. For example, attributes of some shapes, connectors, and other elements may be defined through dynamic means such as depending on data from updateable data sources that may be polled at render time (e.g. a data bar receiving shape information from data stored elsewhere). In some cases, the dynamic relationships between the elements of the diagram may determine attributes of individual shapes and connectors (e.g. an organizational structure diagram).

The diagram visualization service may include a list of supported data sources such as SQL tables, Excel® spreadsheets, WSS® lists, and so on. A system according to embodiments may extend those supported data sources to any data source defined by custom data modules using the defined interface for the service.

Figure 2:
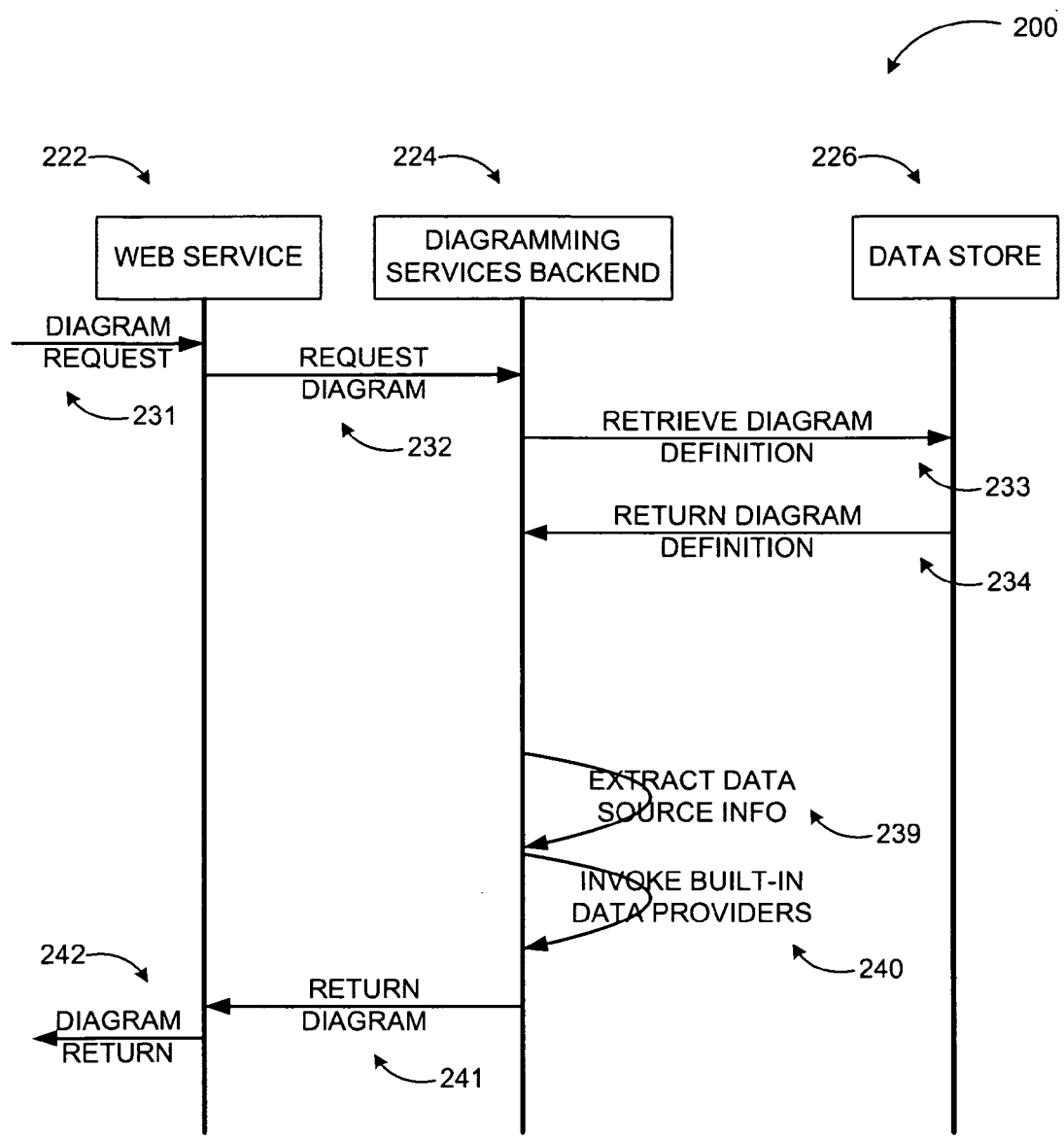
FIG. 2 is a sequence diagram illustrating data flow during an update of data in a web based diagramming service.

FIG. 2 illustrates sequence diagram 200 for data flow during an update of data in a web based diagramming service. Using a rendering application such as a web browser, a diagram consumer may make a request (231) to a server farm of web service 222 for a published diagram. The web service 222 may direct the request for the diagram (232) to diagram services backend such as an update engine. The diagram services backend 224 (update engine) may retrieve the diagram definition (233, 234) from a data store 226 and parse it looking for embedded information that indicates where to retrieve the data for the defined diagram visuals and related data connectivity information. According to one embodiment, following information may be extracted (239) for each record set if some are found: a connection string referring to a supported data source; a query string to execute against the supported data source; and a schema definition for the record set data expected to be returned from the supported data source after the query is run.

For each data connection to a supported data source, the diagram services backend may call built-in data provider (240), which connects to the supported data source, retrieves the particular data by running the query defined above against the supported data source, and validates the record set returned against the schema described above.

The diagram services backend 224 (update engine) may then refresh and return (241) the diagram visual definition by: parsing and extracting visual definitions for data-connected diagram elements from the diagram definition; re-evaluating the publish-time formulas for each attribute of each diagram elements (e.g. background color, height), and rendering the diagram in a vector or raster format depending on the type of request from the browser. The web service 222 may reply to request made by the browser with an updated diagram (242).

Without data source extensibility, a diagram update pipeline is typically limited to refreshing data from data sources with built-in data providers at the update engine only. Those may include Sequential Query Language (SQL) tables, spreadsheet tables, and similar commonly used data sources (e.g. WSS lists). Furthermore, the data aggregation and manipulation formulas used for refreshing the diagram's visual elements may be immutable once encoded into the diagram at publish time.

Figure 3:
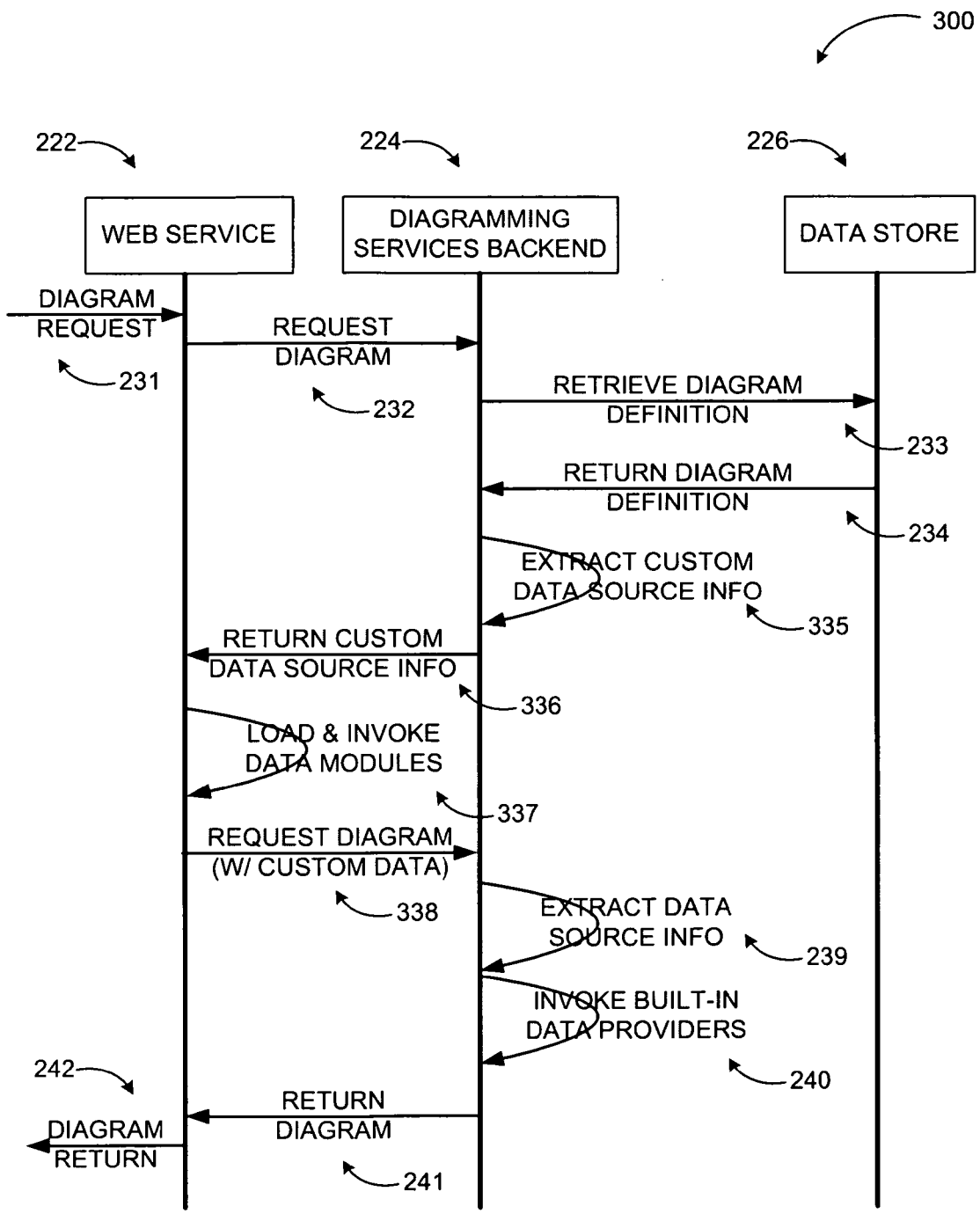
FIG. 3 is another sequence diagram illustrating data flow during an update of data in a web based diagramming service according to embodiments.

FIG. 3 is another sequence diagram 300 illustrating data flow during an update of data in a web based diagramming service according to embodiments. According to some embodiments, data source extensibility is provided by enabling third party users to create web based diagramming service visible custom data provider code (also referred to as custom data modules or custom data providers) and by enabling diagram publishers to reference the custom data modules in their data diagrams. Upon detecting a reference to a custom data module, a web based diagramming service may defer data retrieval operations to the referenced data module. While data modules are bound to implement a predefined abstract class (e.g. the DiagramRefreshAddOn class), developers may implement the internal definitions of the various abstract members, providing them with the flexibility to retrieve data from any data source (or generate data in the data module) and to manipulate the data to be injected into the diagramming service refresh pipeline.

The interactions represented in diagram 300 are between the same components of a system according to embodiments with the diagram request through return of diagram definition steps being similar to the actions described in conjunction with FIG. 2. Differently from diagram 200, if the update engine encounters a connection string that cannot be handled by the built-in data providers, diagramming services backend 224 may attempt to find a connection string referring to a custom data module (335). An example module may be of the form: "Assembly=<assembly>; Class=<class>; <additional information>", where <assembly> is shared space name of the data module assembly, <class> is the shared space class name (including the namespace) implementing the data module abstract class, and <additional information> is additional connection/query information in the format [[Key=Value] . . . ].

If the connection string is extracted, a valid query string to execute against the data source may also be extracted. A schema definition for the data expected to be returned from the data source after the query is run is also extracted. For each reference to a custom data source, the diagramming services backend 224 may defer refresh to an associated data module. This entails the diagramming services backend update engine returning (336) to the front end server (web service 222) that received the initial diagram request and attempting to find any custom data module that matches the <assembly> and <class> tokens described above.

If all the referenced custom data modules are found, update engine code on the front end server may start parallel and asynchronous queries for data by invoking data retrieval (337) (e.g. BeginGetData) on each data module and passing as parameters network context of diagram requester in to enable the personalization of queries, the "additional information" extracted as discussed previously, and other similar information. The data modules run their data retrieval, generation and aggregation code. Through a system of callbacks, the code on the front end server (web service 222) may manage data module data retrieval, errors, and hangs. If one or more data modules fail to execute, the complete request may fail and an error may be returned to the end user.

If no errors occur, the data module returns a structured (e.g. a serialized data set) representation of the retrieved data to the data module driver code. The data return is sent (338) to the diagramming services backend 224, which integrates the data into the diagram update operations in with that of other data providers (custom or built-in). Where data module custom code encounters an exception, developers may create their own exception object and assign it to the error property of the data module to propagate the exception to the update engine for further action. The exception may also be displayed to the end user with an associated exception message.

For each data connection (239, 240) to a supported data source (including the ones defined by the custom data modules), the diagram update engine calls a hard-coded data retrieval code which connects to a supported external data source, retrieves the particular data by running the defined query against the data source, and validates the returned data against the schema described above.

The diagram update engine may then refresh the diagram visual definition by parsing and extracting visual definitions for data-connected diagram elements, re-evaluating the publish-time formulas for each attribute of each diagram elements (the formulas may contain references to the external data retrieved from predefined and custom data sources, and rendering the diagram in a vector or raster format depending on the type of request from the end user. As in FIG. 2, the web service replies to the request (231) with an updated diagram (242).

Components and actions in diagrams 200 and 300 are for illustration purposes only and do not constitute limitation on embodiments. Other components, software or hardware, and configuration may be employed for providing extensibility for web based diagram visualization.

Figure 4:
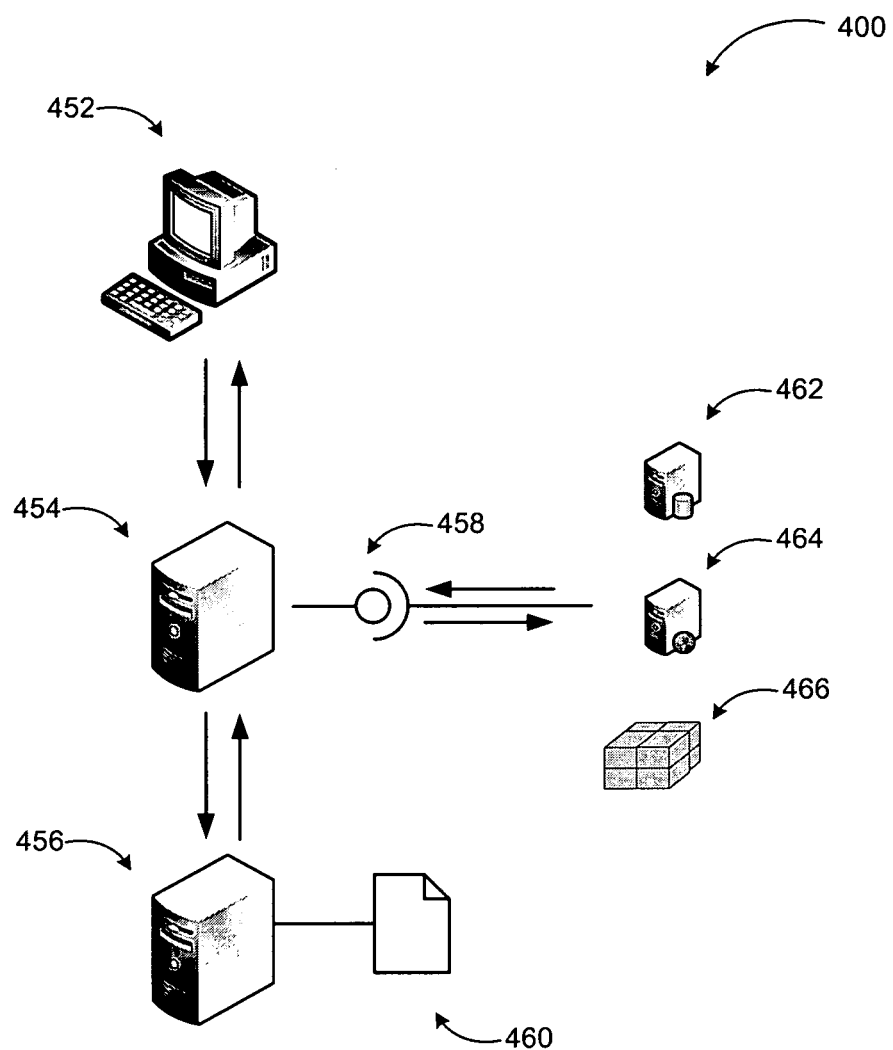
FIG. 4 is a conceptual diagram illustrating major components in a web based diagramming service with a plurality of data sources implementing embodiments.

FIG. 4 is a conceptual diagram illustrating major components in a web based diagramming service with a plurality of data sources implementing embodiments. As in many web based services, a web based diagramming service includes exchange of information between three major components: client device 452 executing client application such as a browser, a web service front end 454 mediating between the client application and the diagram service backend 456, which actually performs the computations for rendering of the diagrams.

Thus, when a diagram with references to external data sources is requested by the client application, web service front end 454 forwards the request to the diagram service backend 456. For data sources not inherently supported by the diagram visualization service, extensibility may be achieved by employing custom data modules. The modules may be installed on the web service server and identified by data connection string identifiers. For each external data source, the diagram service backend 456 may transmit the data connection information to the front end 454. Web service front end 454 communicates the data connection information to the corresponding modules, where the modules implement a predefined abstract class. For example, a data module may include following (shown as pseudo code):

```
MyDataModule
BeginGetData (httpContext, callback, asynchState)
{
```

-continued

```
//A. Register callback
//B. Retrieve user identity & connect to data source
//C. Authenticate and initiate query.
}
EndGetData (asynchState)
{
//D. Transform data into predefined structure.
//E. Return data. Log errors if needed.
}
```

The data sources (e.g. 462, 464, 466) return data through the data modules in the predefined structure or an exception if that is the case to the web service front end 454 through the extensible data flow interface 458. Web service front end 454 returns the data to the back end for further processing, which updates the diagram, performs necessary computations, and renders the diagram to the front end for presentation to the end user's browser at client device 452.

The above discussed scenarios, example systems, applications, and commands are for illustration purposes. Embodiments are not restricted to those examples. Other applications, configurations, communication modes, and commands may be used in implementing an extensible architecture and data flow for web based diagramming service in a similar manner using the principles described herein.

Figure 5:
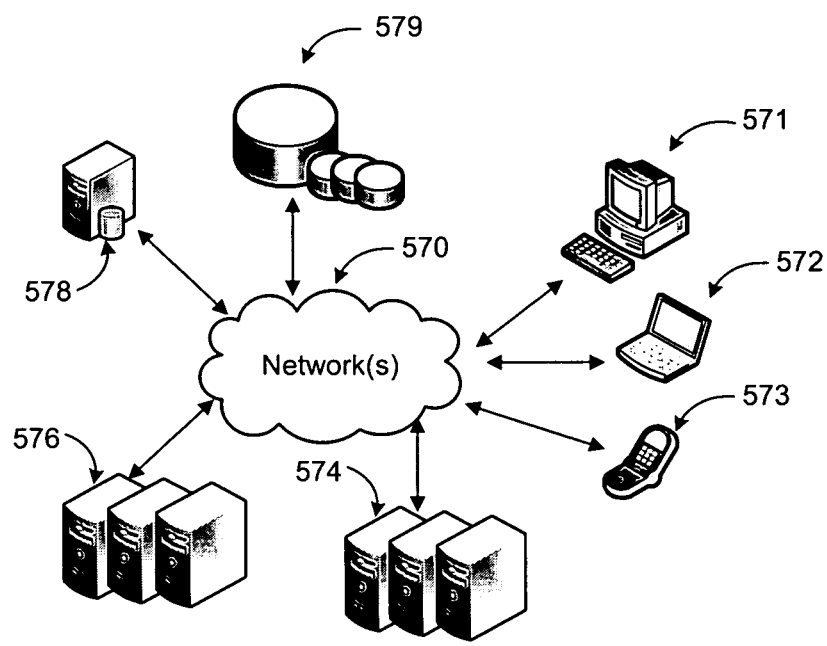
FIG. 5 is a networked environment, where a system according to embodiments may be implemented.

FIG. 5 is an example networked environment, where embodiments may be implemented. A platform providing extensible architecture and data flow for web based diagram visualization services may be implemented via software executed over one or more servers 574 such as a hosted service. The platform may communicate with client applications (e.g. browsers) on individual computing devices such as a smart phone 573, a laptop computer 572, and desktop computer 571 (client devices) through network(s) 570. The web front end service may communicate with diagram services back end executed on a separate group of servers 576.

As discussed above, custom data modules may be used to define processes for retrieving data from data sources not included in the back end service's standard supported data source list. Information associated with web based diagramming services may be stored in one or more data stores (e.g. data stores 579), which may be managed by any one of the servers 576 or by database server 578.

Network(s) 570 may comprise any topology of servers, clients, Internet service providers, and communication media. A system according to embodiments may have a static or dynamic topology. Network(s) 570 may include a secure network such as an enterprise network, an unsecure network such as a wireless open network, or the Internet. Network(s) 570 may also coordinate communication over other networks such as PSTN or cellular networks. Network(s) 570 provides communication between the nodes described herein. By way of example, and not limitation, network(s) 570 may include wireless media such as acoustic, RF, infrared and other wireless media.

Many other configurations of computing devices, applications, data sources, and data distribution systems may be employed to implement a system for providing extensible web based diagramming services through custom data modules. Furthermore, the networked environments discussed in FIG. 5 are for illustration purposes only. Embodiments are not limited to the example applications, modules, or processes.

Figure 6:
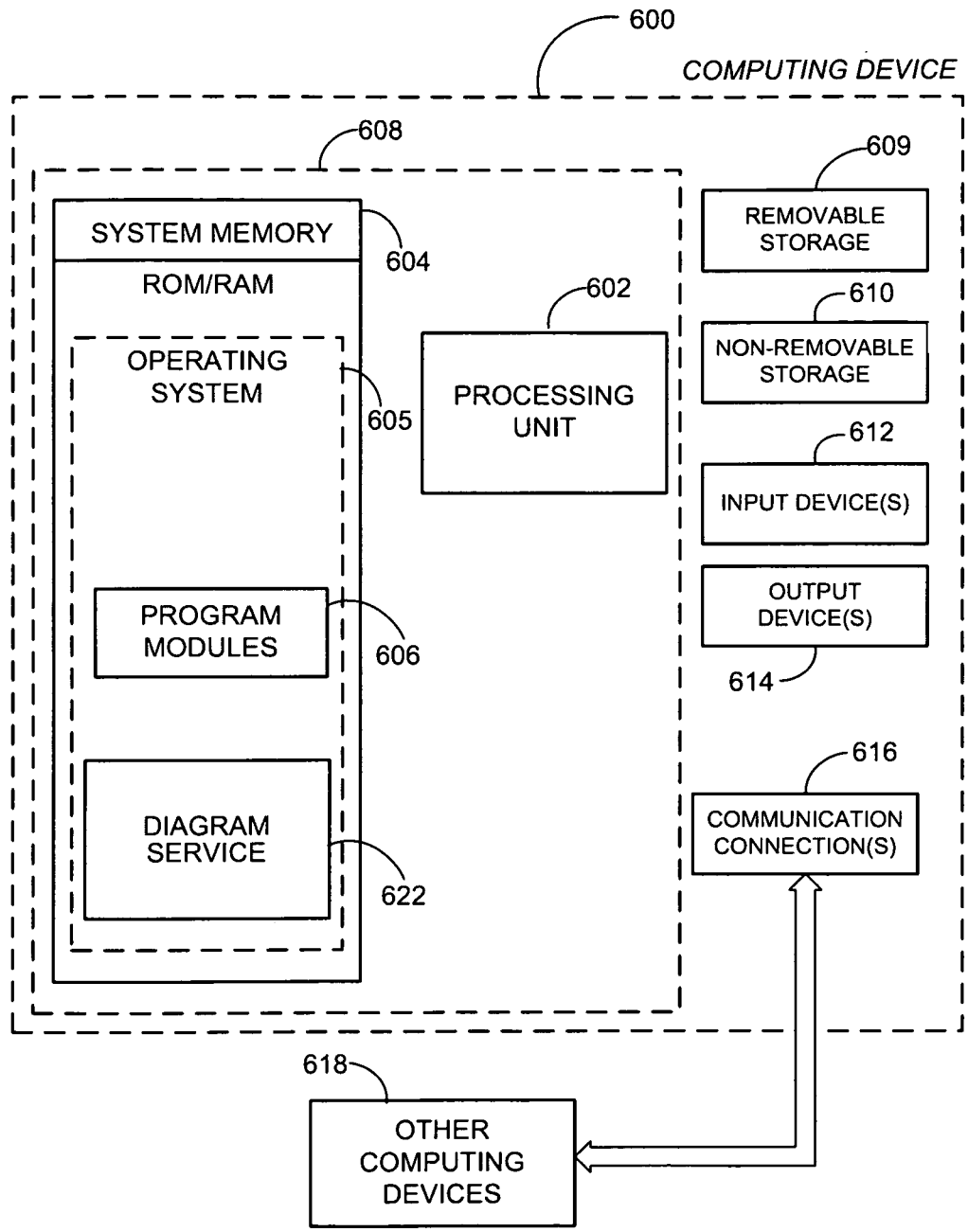
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server of a web front end service providing diagram visualization services to client browsers and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606 and diagram service 622.

Diagram service 622 may extend data source connectivity, manipulation, and aggregation of external data using custom data module(s) as discussed previously. Diagram service 622 may be separate applications or integral modules of a hosted web based service that provides diagram visualization services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, host service servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
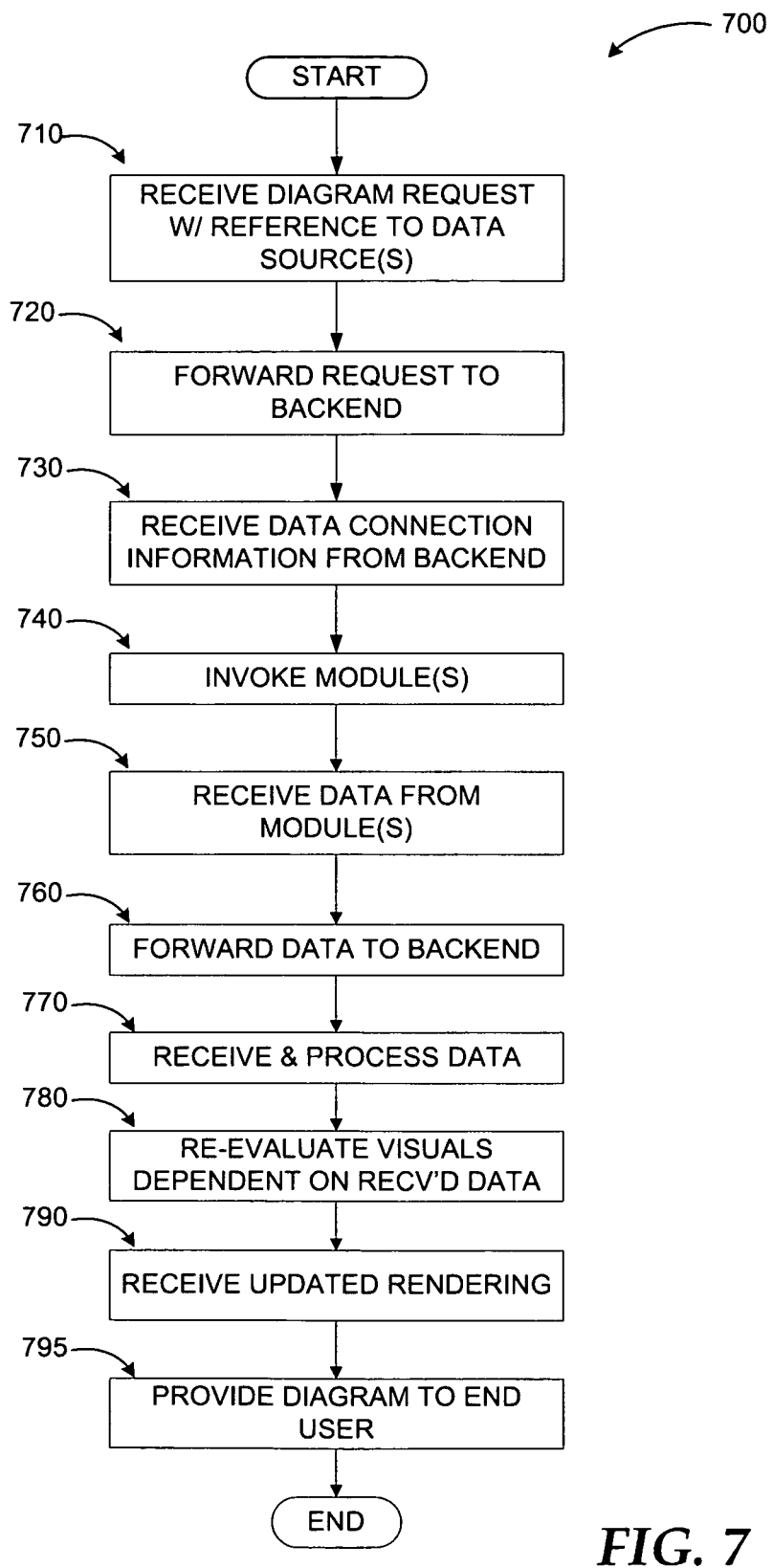
FIG. 7 illustrates a logic flow diagram for a process of providing web accessible diagramming services according to embodiments.

FIG. 7 illustrates a logic flow diagram for process 700 of providing web accessible diagramming services according to embodiments. Process 700 may be implemented as part of a web service as discussed in FIGS. 3 and 4.

Process 700 begins with operation 710, where a diagram request is received from a client application such as a browser. The requested diagram may include references to data from external data sources. At operation 720, the request is forwarded by the web service front end to the diagram services backend. The backend service determines data connection information for each data source and transmits to the web service front end at operation 730. The web service front end uses the data connection information received at operation 730 to communicate with appropriate modules and invoke them at operation 740.

The invoked modules implement an abstract class specified by the web service and return requested data or an exception. This is received at the web service front end at operation 750, which forwards the data to the diagram service backend at operation 760 for further processing. At operations 770 and 780, the data is received and processed at the backend server(s) and diagram visuals dependent on data from custom modules are re-evaluated. Diagram visuals dependent on data from native data sources may be rendered by the backend at any point during the process. The updated rendering of the diagram is received from the backend at operation 790 and provided to the end user's browser at operation 795.

The operations included in process 700 are for illustration purposes. A web based diagram visualization service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:
1. A method to be executed at least in part in a computing device for extensible web based diagram visualization services, the method comprising:
in response to receiving a request for a diagram including references to external data sources, providing the request to an update engine for determination of sup- ported data sources and custom data modules for retrieval from non-supported data sources implementing a predefined abstract class;

receiving a custom data module identifier from the update engine;

invoking the custom data module indicated by the identifier through the predefined abstract class;

receiving one of data and exception from the custom data module;

if data is received, forwarding the data to the update engine;

if an exception is received from the custom data module, providing an exception message to the client application; and mediating presentation of the requested diagram at a client application by a rendering the diagram with updated attributes of elements received from supported and non-supported data sources that are polled at render time based on the forwarded data from the update engine.

2. The method of claim 1, wherein the update engine is configured to perform updates on data from the supported data sources and defer to a corresponding custom data module for data from non-supported data sources.

3. The method of claim 1, wherein the data is associated with at least one from a set of: a shape, a size, a position, and an attribute of an element in the requested diagram.

4. The method of claim 1, further comprising:
upon determining all custom data modules, initiating parallel and asynchronous queries on each custom data module.

5. The method of claim 4, wherein a network identifier of requesting client application and additional connection and query information is passed to each custom data module as parameters.

6. The method of claim 1, wherein each custom data module is configured to retrieve, generate, and aggregate data and return employing callbacks.

7. The method of claim 1, wherein the data is returned in a serialized data set object.

8. The method of claim 1, further comprising:
parsing and extracting visual definitions for diagram elements connected to external data;
re-evaluating publish-time formulas for each attribute of the diagram elements with references to the external data; and
rendering the diagram.

9. The method of claim 8, wherein the diagram, is rendered in one of: vector format and raster format.

10. A computer system for executing a diagram service for extensible web based diagram visualization, the computer system comprising:
a web front end (WFE) server that includes a memory and a processor coupled to the memory, the processor configured to:
in response to receiving a request for a diagram from a browser including a reference to an external data source implementing a predefined abstract class, forward the request to an update engine;
receive a connection string referring to a custom data module from the update engine;
invoke the custom data module for retrieval, generation, and aggregation of data through the predefined abstract class from the external data source;
receive data in a predefined format from the custom data module;
forward the received data to the update engine;
receive rendered diagram from the update engine with updated attributes of elements received from supported and non-supported data sources that are polled at render time; and
provide the rendered diagram to the browser; and
a backend server that includes a memory and a processor coupled to the memory, the processor configured to execute the update engine, wherein the backend engine is arranged to:
for each diagram element with a reference to a supported external data source, return a connection string for the supported data source to the WFE;
for each diagram element with a reference to a non-supported external data source determine a connection string for a custom data module; and
if a custom data module is found, return the connection string for the custom data module to the WFE; else return an error code to the WFE.

11. The computer system of claim 10, wherein the connection string for the custom data module includes a name of the custom data module, a class for implementing the custom data module class, and additional connection and query information in a predefined format.

12. The computer system of claim 10, wherein the update engine is further arranged to return a query string to be executed against the supported data source and a schema definition for data expected to be returned from the supported data source.

13. The computer system of claim 12, wherein the update engine is further arranged to connect to the supported data source, retrieve the data by executing a query defined by the query string, and validate the data against the schema.

14. The computer system of claim 13, wherein each custom data module is configured to retrieve and aggregate data through a system of callbacks from the WFE, and return the data to the WFE.

15. The computer system of claim 10, wherein the processor of the WFE is further configured to return a failure message to the browser if a custom data module referenced by the requested diagram fails to return data.

16. A non-signal computer-readable storage medium with instructions stored thereon for extensible web based diagram visualization services, the instructions comprising:
receiving a request for a diagram including references to external data sources;
for references to supported data sources:
determining the referenced data source;
connecting to the referenced data source;
retrieving data by executing a query; and
validating the retrieved data;
for references to non-supported data sources:
determining custom data modules for data from referenced non-supported data sources implementing a predefined abstract class;
invoking the determined custom data modules by passing a network context of a requesting client application and connection/query information to the custom data modules through the predefined abstract class; and
receiving data from the custom data modules;
parsing and extracting visual definitions for data-connected diagram elements with updated attributes of the diagram elements received from supported and non-supported data sources that are polled at render time, wherein dynamic relationships between the diagrams elements of the diagram determine attributes of individual shapes and connectors;

computing publish-time formulas for the diagram elements;

rendering the requested diagram based on the updated publish-time formulas in one of a vector and raster format depending on a type of request from the client application; and providing the rendered diagram to the requesting client application.

17. The non-signal computer-readable medium of claim 16, wherein the custom data modules are further configured to authenticate a requestor based on the network context.

18. The non-signal computer-readable medium of claim 16, wherein the instructions further comprise invoking the custom data modules and receiving data through one of: parallel and asynchronous callbacks.

19. The non-signal computer-readable medium of claim 16, wherein the requested diagram is rendered based on received data from supported and non-supported data sources at a backend server and the rendered diagram provided to the requesting client application by a web front end server.

* * * * *